US010379311B1

(12) United States Patent  
Krywicki et al.

(10) Patent No.: US 10,379,311 B1  
(45) Date of Patent: Aug. 13, 2019

(54) OVER-MOLDED MULTI-OPTICAL FIBER RIBBON CABLE AND METHOD OF MAKING SAME

(71) Applicant: Northrop Grumman Systems Corporation, Falls Church, VA (US)

(72) Inventors: Jason Krywicki, Glen Burnie, MD (US); Gregg A. Robertson, Linthicum Heights, MD (US); Stephen E. Krug, Ellicott City, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/944,911

(22) Filed: Apr. 4, 2018

(51) Int. Cl.  
*G02B 6/44* (2006.01)  
*G02B 6/36* (2006.01)

(52) U.S. Cl.  
CPC ......... *G02B 6/4472* (2013.01); *G02B 6/3608* (2013.01); *G02B 6/3676* (2013.01); *G02B 6/443* (2013.01); *G02B 6/4478* (2013.01)

(58) Field of Classification Search  
CPC ... G02B 6/3608; G02B 6/4472; G02B 6/4475  
See application file for complete search history.

(56) References Cited

U.S. PATENT DOCUMENTS

| | | | |
|---|---|---|---|
| 6,576,841 B1 | 6/2003 | Brannan et al. | |
| 7,272,282 B1 | 9/2007 | Seddon et al. | |
| 7,327,943 B2 | 2/2008 | Vo et al. | |
| 7,354,202 B1 | 4/2008 | Luger | |
| 7,609,925 B2 | 10/2009 | Gronvall et al. | |
| 7,630,606 B2 | 12/2009 | Lu et al. | |
| 8,465,212 B2 | 6/2013 | Bradley | |
| 8,582,938 B2 | 11/2013 | Cody et al. | |
| 8,958,673 B2 | 2/2015 | Cline et al. | |

(Continued)

FOREIGN PATENT DOCUMENTS

JP 08278431 A * 10/1996 ........... G02B 6/4472

OTHER PUBLICATIONS

Jiri George Drobny, Fluoroelastomers Handbook: The Definitive User's Guide 546, 2d Ed., 2016.

(Continued)

*Primary Examiner* — Michelle R Connelly  
(74) *Attorney, Agent, or Firm* — Edell, Shapiro & Finnan, LLC

(57) ABSTRACT

An over-molded multi-optical ribbon fiber assembly comprises a housing over-mold including a middle section having first and second ends that branch into first legs and second legs, respectively. The assembly further comprises multiple sets of optical fibers. The optical fibers of all of the sets extend through the middle section as individual optical fibers in a non-ribbon fiber, stacked configuration. The optical fibers of each set further: extend through a respective first leg and a respective second leg of the housing; extend past a free-end of the respective first leg, and transition to a respective first ribbon fiber outside of the housing; and extend past a free-end of the respective second leg, and transition to a respective second ribbon fiber outside of the housing. The assembly further comprises multiple optical fiber connectors each terminating a respective one of the first and second ribbon fibers.

20 Claims, 7 Drawing Sheets

(56) References Cited

U.S. PATENT DOCUMENTS

| | | |
|---|---|---|
| 9,507,097 B2 | 11/2016 | Harwath et al. |
| 2002/0015563 A1* | 2/2002 | Murakami ............... G02B 6/43 385/53 |
| 2003/0198446 A1* | 10/2003 | Sun ...................... G02B 6/3612 385/115 |
| 2006/0088258 A1* | 4/2006 | Sasaki ................. G02B 6/4403 385/114 |
| 2007/0196059 A1 | 8/2007 | Kojima |
| 2008/0069500 A1 | 3/2008 | Harness et al. |
| 2009/0152746 A1 | 6/2009 | Wells et al. |
| 2013/0259434 A1 | 10/2013 | Bringuier et al. |

OTHER PUBLICATIONS

Bryan William Harris, Fiber Optics for Flight Control Systems, M.S. thesis—University of Dayton, 2014.
Glenair Fiber Optic Interconnect Solutions, 2006.

* cited by examiner

US 10,379,311 B1

OVER-MOLDED MULTI-OPTICAL FIBER RIBBON CABLE AND METHOD OF MAKING SAME

STATEMENT OF GOVERNMENTAL INTEREST

This invention was made with U.S. Government support under contract no. 60112 awarded by the U.S. Government. The U.S. Government has certain rights in the invention.

TECHNICAL FIELD

The present disclosure relates to optical cables.

BACKGROUND

Optical ribbon fiber (referred to more simply as "ribbon fiber") has a generally flat, regular cable structure that includes multiple optical fibers extending in parallel with each other and held together by a thin layer of bonding material, such as a thin layer of acrylate. The acrylate holds the optical fibers together and thus maintains the integrity of the ribbon fiber during manufacturing processes involving flexing and bending of the ribbon fiber and upon insertion of the ribbon fiber into an optical fiber connector. Shock to, and vibration of, the ribbon fiber may cause the acrylate to disintegrate. Additionally, oils from the skin of a person handling the ribbon fiber may cause the acrylate to disintegrate. Under such conditions, the optical fibers may separate from the ribbon fiber and break. Wherever the (flat) ribbon fiber makes a 90° turn, the ribbon fiber transitions from a horizontal plane (e.g., a resting plane) to a vertical plane because the ribbon fiber is unable to make an "in-plane" 90° turn. In other words, the ribbon fiber folds over on itself in the turn. This "upward bank" of the ribbon fiber in the turn also creates stress in the ribbon fiber at an optical connector joined to the ribbon fiber proximate the turn.

SUMMARY OF THE INVENTION

An over-molded multi-optical ribbon fiber assembly comprises an integrally formed housing over-mold including an elongate middle section having a first end that branches into spaced-apart first legs and a second end that branches into spaced-apart second legs. The assembly further comprises multiple distinct sets of optical fibers. The optical fibers of all of the sets extend through the middle section of the housing as individual optical fibers in a non-ribbon fiber, densely packed, stacked configuration of the individual optical fibers. The optical fibers of each set of optical fibers further: extend through a respective first leg and a respective second leg of the housing; extend past a free-end of the respective first leg, and transition to a respective first optical ribbon fiber outside of the housing (beyond the respective first leg); and extend past a free-end of the respective second leg, and transition to a respective second optical ribbon fiber outside of the housing (beyond the respective second leg). The assembly further comprises multiple optical fiber connectors each terminating a respective one of the first and second optical ribbon fibers.

DESCRIPTION OF EXAMPLE EMBODIMENTS

Example Embodiments

Figure 1A:
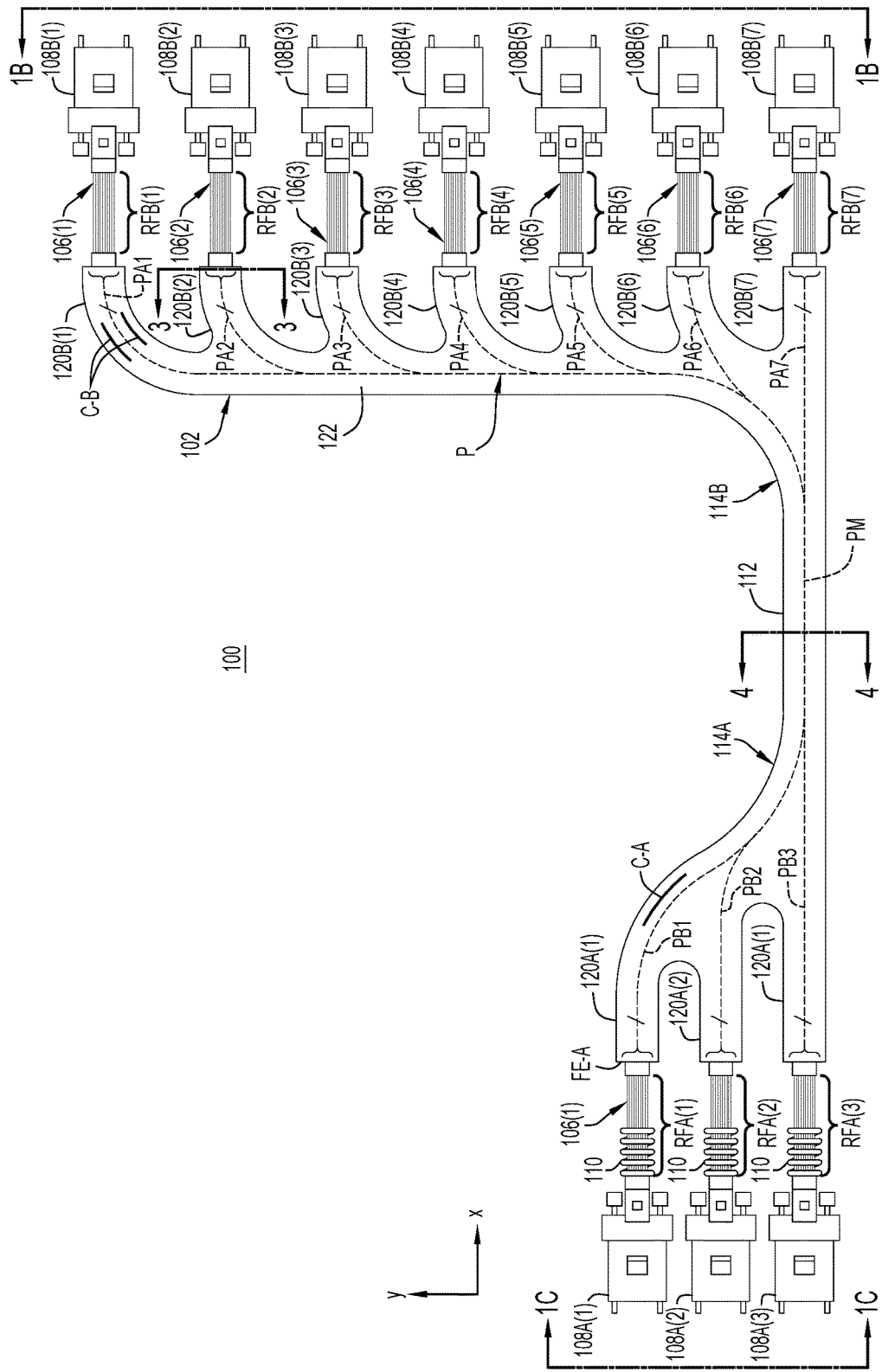
FIG. 1A is a top view of an example over-molded multi-optical fiber ribbon assembly or cable ("the assembly"), according to the invention.

With reference primarily to FIG. 1A, there is shown a top view of an example over-molded multi-optical fiber ribbon assembly or cable 100 (referred to more simply as "assembly 100") according to the invention. At a high-level, assembly 100 includes: an over-molded housing 102 (a top-side of which is shown in FIG. 1A); multiple distinct sets 106(1)-106(7) (collectively "sets 106") of optical fibers partially embedded in and also partially extending outside of left and right sides of the housing; and multiple left optical fiber connectors 108A(1)-108A(7) (see also FIG. 1C) and multiple right optical fiber connectors 108B(1)-108B(7) terminating ends of corresponding ones of the sets of optical fibers (specifically, ribbon fibers) extending outside of the housing. Assembly 100 may also include individual connector springs 110 coupled with various ones of optical fiber connectors 108A and/or 108B, as shown in FIG. 1A. In the ensuing description, the terms "left" and "right" may be used synonymously and interchangeably with the terms "first" and "second."

Housing 102 (also referred to as a "housing over-mold 102") is formed as a single or unitary, integrally-formed, molded block of a fluorosilicone compound, or other similar molding compound. Housing 102 includes an elongate middle section 112 having a longitudinal axis extending in the x-direction. The elongate middle section 112 includes a left-end 114A and a right-end 114B at opposite ends of the middle section, such that the right-end is spaced-apart from the left-end in the x-direction. Housing 102 also includes multiple substantially parallel left legs 120A(1)-120A(3) (collectively "legs 120A") generally extending in the x-direction and spaced-apart from each other generally in the y-direction, and multiple substantially parallel right legs 120B(1)-120B(7) (collectively "legs 120B") also generally extending in the x-direction and spaced-apart from each other generally in the y-direction. Left legs 120A(1)-120A(3) and right legs 120B(1)-(3) extend in opposite directions from the middle section 112. Middle section 112, left legs 120(A), and right legs 120(B) generally extend in the x-y plane and have rectangular cross-sections in a plane transverse to the x-y plane, e.g., in the y-z plane, as shown in the cross-section views of FIGS. 3 and 4.

Left legs 120A respectively include (i) left free-ends FE-A having generally rectangular respective cross-sections in the y-z plane, and (ii) curved sections C-A extending rightward from the left free-ends to merge together into left-end 114A of middle section 112. For the sake of clarity, in FIG. 1A, only curved section C-A and free-end FE-A of left leg 120A(1) among left legs 120A are labeled. Similarly, right legs 120B respectively include (i) right free-ends FE-B having generally rectangular cross-sections in the y-z plane, and (ii) curved sections C-B extending leftward from the right free-ends to merge together into right-end 114B via an elongate branch section 122 generally extending in the y-direction (i.e., branch section 122 branches or transitions right-end 114B of middle section 112 into right legs 120B via curved sections of the right legs). For clarity in FIG. 1A, only curved section C-B and free-end FE-B of right leg 120B(1) is labeled. As shown in FIG. 1A, at least some of the above-mentioned curved sections of legs 120A and 10B include bends of 90 degrees or more. Also, all of the curved sections of legs 120A and 120B are each formed to have a respective bend radius that is not less than (i.e., is greater than or equal to) a predetermined minimum bend radius.

The predetermined minimum bend radius is a bend radius at, and above which, optical fiber following that bend radius maintains maximum optical transmission performance (e.g., maximum throughput and maximum speed of light) along its length in the bend, and below which the optical transmission performance degrades. The predetermined minimum bend radius is matched to known characteristics of the optical fiber embedded in housing 102. In an embodiment, the predetermined minimum bend radius is approximately 0.5 inches, although a predetermined bend radius above or below 0.5 inches may be used depending on the type of optical fiber.

Figure 1B:
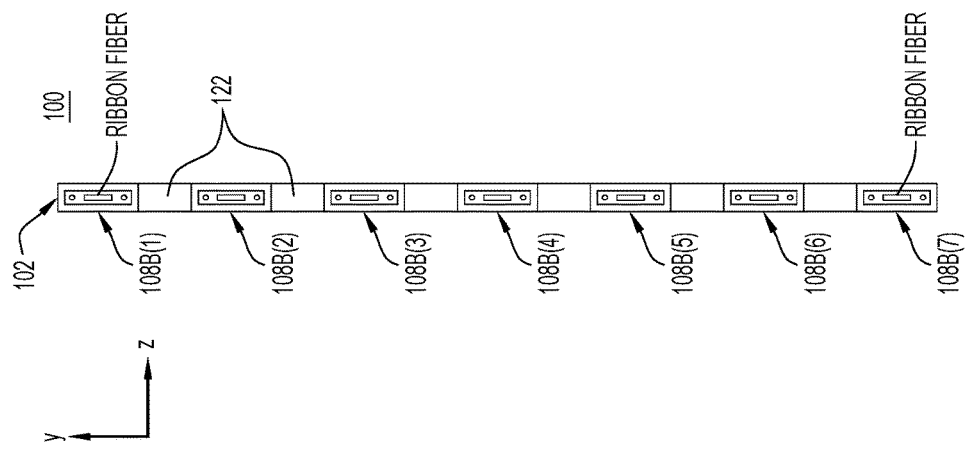
FIG. 1B is a right-side view of the example assembly of FIG. 1A, according to the invention.

With reference to FIG. 1B, there is a side-view of assembly 100 in the y-z plane taken across line 1B of FIG. 1A. The side of view of FIG. 1B shows connectors 108B spaced from each other in the y-direction by interspersed portions/lengths of branch section 122 of housing 102.

Figure 1C:
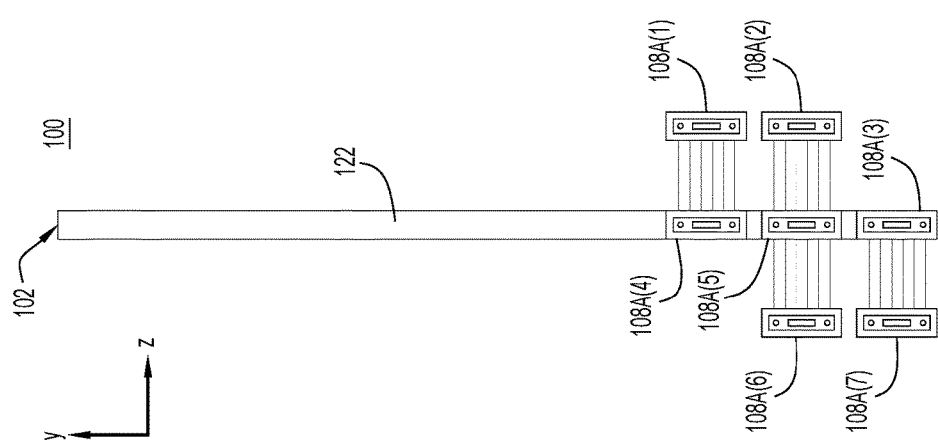
FIG. 1C is a left-side view of the example assembly of FIG. 1A, according to the invention.

With reference to FIG. 1C, there is a side-view of assembly 100 in the y-z plane taken across line 1C of FIG. 1A. The side of view of FIG. 1C shows connectors 108A(1)-108(7) stacked in the z-direction at a bottom portion of branch section 122 of housing 102. The following sets of connectors are shown stacked one on top of the other in the z-direction: (108A(1), 108A(4)), (108A(2), 108A(5), 108A(6)), and (108A(3), 108A(7)). For clarity, optional connector springs 110 are not shown in FIG. 1C.

The configuration or arrangement of sets 106 of the optical fibers of assembly 102 with respect to housing 102 is now described in detail. Each set 106(i) of optical fibers includes multiple, generally coextensive, optical fibers having: left-end lengths extending outside of the left-side of housing 102 as ribbon fiber RFA(i) and terminating in a respective left optical fiber connector 106A(i); right-end lengths extending outside of the right-side of housing 102 as ribbon fiber RFB(i) and terminating in a respective right optical fiber connector 106B(i); and intermediate/middle lengths (not specifically shown in FIG. 1A) embedded in and extending through housing 102 as "individual" fibers in a non-ribbon fiber configuration that generally trace-out paths P (more specifically indicated at PA1-PA7, PB1-PB3, and PM) through the housing, as shown in FIG. 1A.

Figure 4:
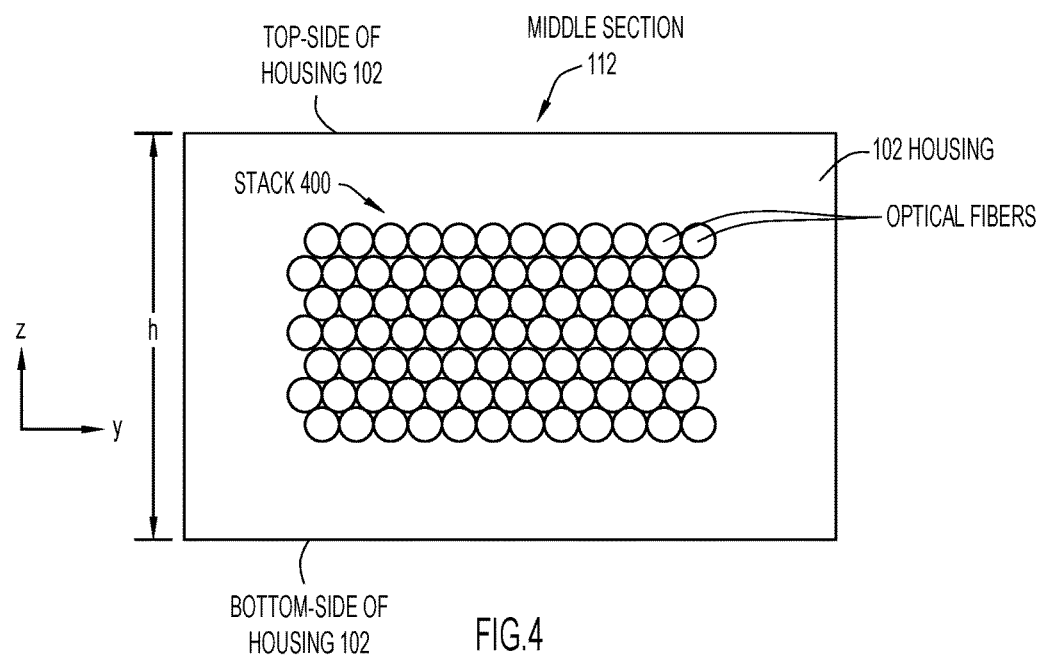
FIG. 4 is a cross-sectional view of a middle section of the example assembly, taken through line 4 in FIG. 1A, according to an embodiment of the invention.

More specifically, all of the multiple optical fibers of all of sets 106(1)-106(7) are embedded in and extend through middle section 112 of housing 102 as "individual" optical fibers, to form a densely or tightly packed, stacked configuration of all of the optical fibers in the middle section. In an embodiment, the "stack" of individual optical fibers is encapsulated on all sides of the stack along its length extending in the x-direction by the molding compound that forms housing 102, as shown in FIG. 4. The term "individual" means that the optical fibers are in a non-ribbon fiber configuration, that is, are not constrained to ribbon fiber. The individually stacked optical fibers are more closely packed together than if they were constrained to ribbon fiber. Example stacked configurations of the individual optical fibers are described below in connection with FIG. 4. Additionally, the optical fibers of each set 106(i):

a. Are embedded in and extend through respective left leg 120A(i) (including its curved portion C-A) as individual optical fibers, and are embedded in and extend through respective right leg 120B(i) (including its curved portion C-B) as individual optical fibers. Embedding the optical fibers in respective left and right legs 120A(i), 120B(i) individually avoids out-of-plane ribbon fiber bends that would otherwise occur in curved portions C-A and C-B if the optical fibers were configured as or constrained to ribbon fiber, and thus contributes to in-plane compactness of assembly 100. The individual optical fibers extending through the above-mentioned curved sections form a substantially planar layer of optical fibers that make 90 degree bends substantially in-plane (i.e., in the x-y plane) and with a bend radius at or above the predetermined minimum bend radius, instead of being forced to bank upward at 90 degrees as would be the case if the same optical fibers were constrained to a ribbon fiber configuration, thus avoiding rotational stress where the sets of optical fibers join connectors 108A and 108B outside of housing 102, as described below;

b. Extend past or beyond the left free-end of respective left leg 120A(i) and transition from individual optical fibers to respective ribbon fiber RFA(i) outside of and to the left of housing 102; and c. Extend past the right free-end of respective right leg 120B(i) and transition from individual optical fibers to respective ribbon fiber RFB(i) outside of and to the right of housing 102.

In the example of FIG. 1A, housing 102 includes the same number (7) of right legs 120B as sets 106 of optical fibers. Therefore, each right leg 120B(i) accommodates a corresponding set 106(i) of the optical fibers in a 1-to-1 relationship of right leg to set of optical fibers. On the other hand, housing 102 includes fewer left legs 120A (3) than right legs 120B (7). Accordingly, multiple ones of sets 106 of the optical fibers are stacked in each of left legs 120A in order to accommodate all of the sets in the fewer left legs. For example, (i) the optical fibers of the two sets 106(1) and 106(4) are stacked in left leg 120A(1), (ii) the optical fibers of the 3 sets 106(2), 106(5), and 106(6) are stacked in left leg 120A(2), and (iii) the optical fibers of the 2 sets 106(3) and 106(7) are stacked in left leg 120A(3). The aforementioned stacked sets of optical fibers (106(1), 106(4)), (106(2), 106(5), 106(6)), and (106(3), 106(7)) exit corresponding ones of left legs 120A(1), 120A(2), and 120A(3) and connect with corresponding ones of connectors (108A(1), 108A(4)), (108A(2), 108A(5), 108A(6)), and (108A(3), 108A(7)), shown in FIG. 1C. Connectors 108A and 108B may include "MT" fiber optic connectors.

The transitions of optical fiber sets 106 between ribbon fiber RFA(i), RFAB(i) and the individual optical fiber configurations as described above results in a more physically compact cable assembly than would otherwise be possible because of the close packing of the individual optical fibers in middle section 112. Moreover, employing the individual optical fibers in middle section 112 and through the curved sections of legs 120A, 120B avoids out-of-plane ribbon fiber bends through the curve portions or proximate connectors 108A, 108B that would otherwise occur if only ribbon fiber were employed, i.e., in the absence of the individual optical fiber configuration in housing 102. This avoids or reduces stress where the optical fibers join connectors 108A and 108B.

Figure 2:
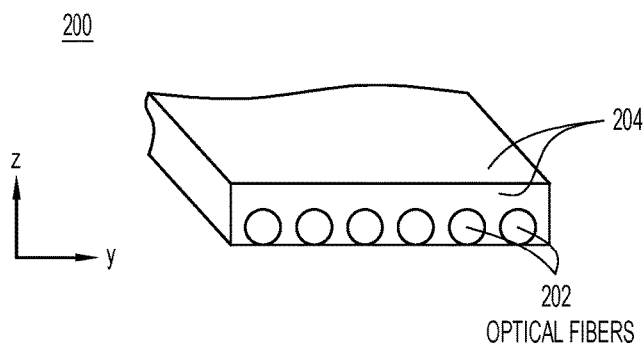
FIG. 2 is a perspective view of an example ribbon fiber, according to the invention.

With reference to FIG. 2, there is a perspective view of an example ribbon fiber 200 representative of ribbon fiber RFA(i) and RFB(i). Ribbon fiber 200 includes a single layer of N parallel optical fibers 202 lying flat in a plane and held/bonded together by a thin layer of bonding material 204, such as acrylate. In the example of FIG. 2, N=6, but N may be smaller or larger, e.g., N may have a value of 12, 18, 20, and so on. Ribbon fiber 200 has a width in the y-direction and a height in the z-direction. The height is a combined height of one of optical fibers 202 and a thickness of the bonding layer 204. In an example, the height of ribbon fiber 200 is approximately 0.02 inches tall.

Figure 3:
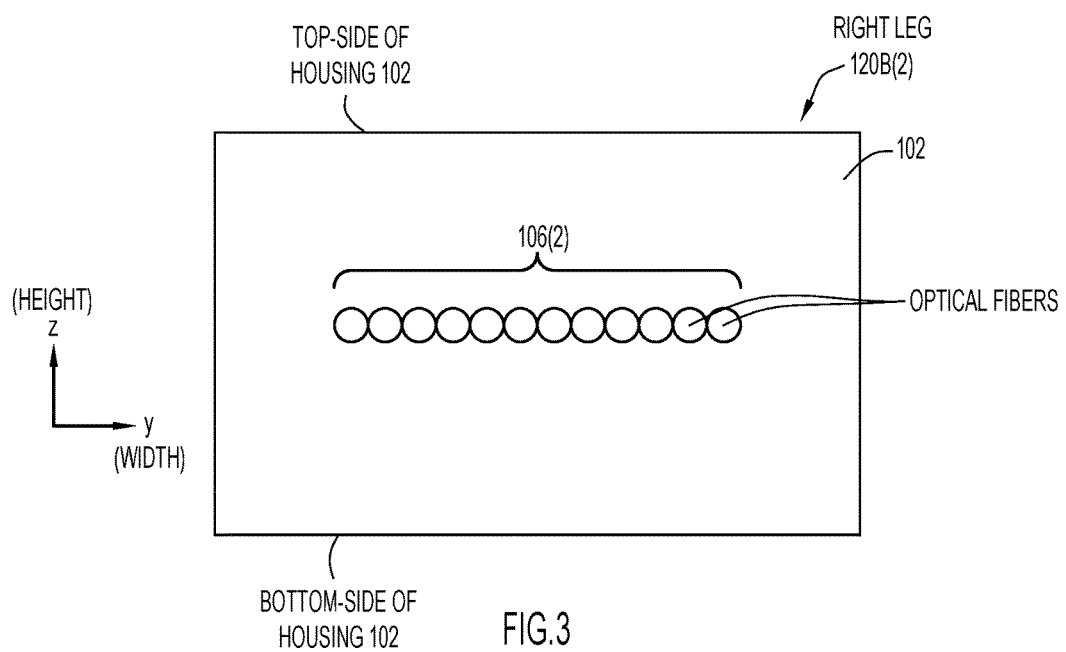
FIG. 3 is a cross-sectional view of a right leg of a housing over-mold of the example assembly, taken through line 3 in FIG. 1A, according to the invention.

With reference to FIG. 3, there is a cross-section view in the y-z plane of right leg 120B(2), taken along slice 3 in FIG. 1A. The configuration shown in the cross-section view of FIG. 3 is representative of the cross-sections of each of legs 120B(i). The cross-section view of FIG. 3 shows a single layer of N individual optical fibers of set 106(2) (where N=12) embedded in housing 102 such that the optical fibers lie parallel to the x-y plane, and a portion of over-molded housing 102 corresponding to right leg 120B(2). In the layer of optical fibers, each individual optical fiber may in direct contact with its immediately, horizontally adjacent neighbors due to the absence of any acrylate that may otherwise separate the immediately adjacent neighbors. In the example of FIG. 3, housing 102 fully encapsulates all of the components in the housing, including the optical fibers of set 106(2). That is, the molding material of housing 102 entirely surrounds the optical fibers (i.e., the housing surrounds all sides of the components, including the top, the bottom, the left side, and the right side of the components, as shown in FIG. 3). The cross-section of housing 102 shown in FIG. 3, e.g., the cross-section of right leg 120B(2) and the other legs, may have a height, from the bottom side to the top side of the housing, of approximately 0.190 inches, or less, for example. Each optical fiber may have a diameter of approximately 0.010 inches.

The cross-section view of FIG. 3 also represents the cross-section view of each of legs 120B(i) in the curved section of the leg. Through/along the curved section, the optical fibers lie in-plane, i.e., parallel to the x-y plane, and thus do not "bank-up" out of plane as in the case of a ribbon fiber. Viewing left-to-right in FIG. 3, the optical fibers have increasing bend radii, which enables the optical fibers to lie in-plane around the bend. This is because the left-most optical fibers is closest to the origin of the bend while the right-most optical fiber is farthest from the origin of the bend.

With reference to FIG. 4, there is a cross-section view in the y-z plane of housing middle section 112, taken along slice 4 in FIG. 1A. As shown in FIG. 4, a stack 400 of individual optical fibers includes a mix of all of the optical fibers from all of sets 106(1)-106(7) closely packed together and stacked in the z-direction (vertically) and in the y-direction (horizontally) in the middle section. In the example of FIG. 4, stack 400 has an approximately rectangular cross-section, although other shapes are possible. Also, the cross-section of stack 400 has a height and a width that are less than a height and a width of the cross-section of middle section 112, and the stack is positioned to be relatively "centered" within the middle section cross-section, such that the molding material of the middle section fully encapsulates an outer periphery of stack 400 (i.e., housing 102 at middle section 112 surrounds all sides of the stack, including the top, the bottom, the left side, and the right side of the stack) along corresponding, coextensive lengths of the stack and middle section extending in the x-direction (i.e., transverse to the cross-section).

All of the optical fibers of stack 400 are stacked without the presence of bonding material 204 (e.g., acrylate) used with conventional ribbon fiber. Thus, the individual optical fibers of stack 400 form multiple, closely packed, substantially flat (i.e., "regular") layers of individual optical fibers of sets 106 stacked in the z-direction, as shown in FIG. 4. Alternatively, the layers may be irregular or bumpy in contrast to being substantially flat. In the example of FIG. 4, the layers each correspond to a respective one of sets 106 of the individual optical fibers and include all of, and only, the individual optical fibers of the respective one of the sets. The individual optical fibers of each of the layers may be in direct contact with the individual optical fibers of adjacent ones of the layers of the individual optical fibers that are above and below the given layer. Also, individual optical fibers in a given layer may be in direct contact with each other. That is, in the stacked configuration of FIG. 4, many of the stacked individual optical fibers are in direct contact with other adjacent ones of the stacked individual optical fibers in both the y- and z-directions due to the absence of the bonding material 204 (e.g., acrylate) that would otherwise impede such direct contact. This enables the individual optical fibers to be stacked in multiple even or uneven layers (e.g., in the z-direction) with different, or alternatively the same, numbers of optical fibers in each layer. These layers may each include more, less, or the same number of optical fibers as in a given ribbon fiber outside of housing 102. The individual optical fibers may be stacked in layers having decreasing numbers of optical fibers per layer as the layers ascend in the y-direction, to form a generally pyramid-shaped stack. Alternatively, the individual optical fibers may be arranged randomly in a stacked configuration that does not include discernible layers of optical fibers.

Assuming each distinct set 106(i) of optical fibers includes N optical fibers, the total number of individual optical fibers stacked in middle section 112 is equal to (N× the total number of sets 106). In the example of FIG. 4, the total number of optical fibers stacked in middle section 112 is (12×7)=84. In the N=12 example, (i) the width of middle section 112 in the y-direction is slightly larger than the width of 12 closely packed optical fibers because housing 102 fully encapsulates/surrounds the optical fibers, and (ii) the example height h of the middle section in the z-direction is approximately only 0.154 inches because of the close packed stacking of the individual fibers in the absence of the bonding material (204) that would otherwise impede the compact stacking if all of the optical fibers were stacked in the middle section as ribbon fibers (e.g., if the 7 ribbon fibers RFA(i) were stacked one on top of the other). In other words, middle section 112 has height h (in the z-direction) that is less than a combined height of all of the ribbon fibers (e.g., all 7 of RFB(i)). Additionally, middle section 112 has a width (in the y-direction) that is less than a combined width of all of the ribbon fibers side-by-side.

Figure 5:
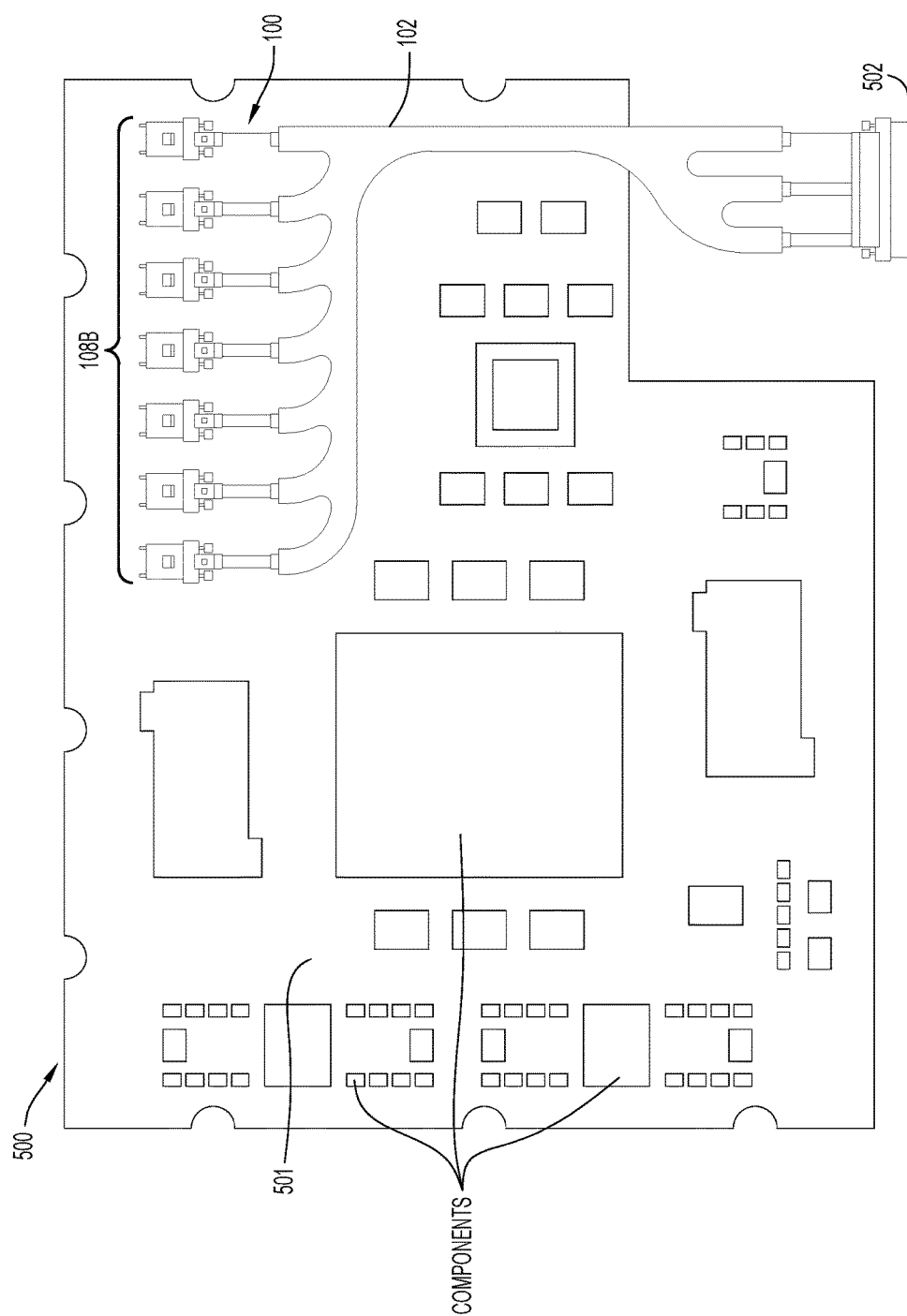
FIG. 5 is a top-view of an example printed circuit board (PCB) employing the example assembly of FIG. 1A, according to the invention.

With reference to FIG. 5, there is a top-view of an example printed circuit board (PCB) 500 employing assembly 102. In the example of FIG. 5, connectors 108B are fixed to a top surface 501 of PCB 500, and a bottom surface of housing 102 (not shown in FIG. 5) is also fixed against the top surface of the PCB. Adhesive, screws, and/or brackets may be employed to fix housing 102 to PCB 500. In the example of FIG. 5, a 7-position connector holder 502 retains connectors 108A.

It is understood that assembly 100 is described above by way of example, only, and may be provided in many different configurations. For example, housing 102 may have many different shapes, more or less left legs, and more or less right legs, to accommodate more or less sets of optical fibers, which may be connected to more or less corresponding optical fiber connectors.

Figure 6:
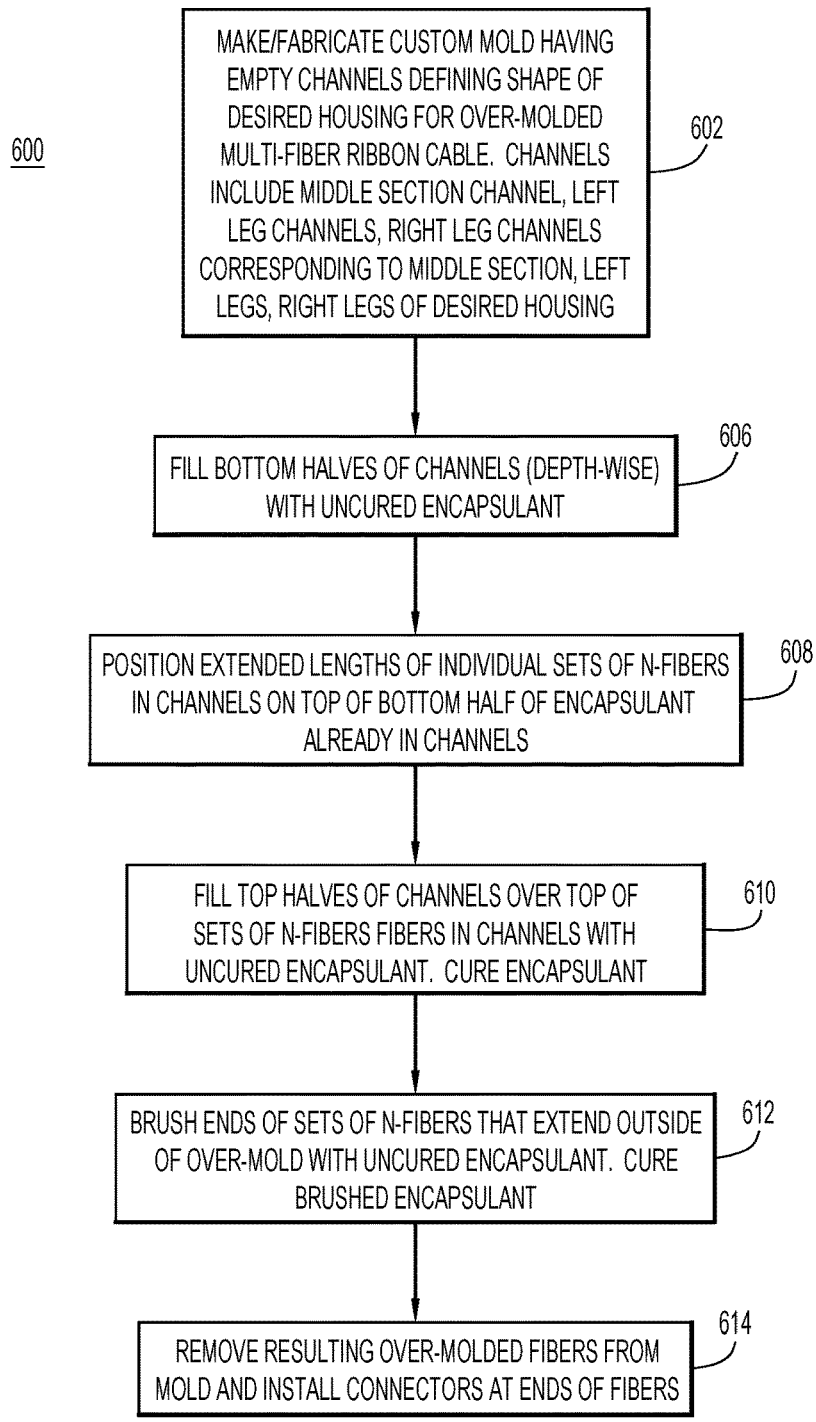
FIG. 6 is a flowchart illustrating an example method of making the example assembly of FIG. 1A, according to the invention.

With reference to FIG. 6, there is shown an example method of making over-molded multi-optical fiber ribbon assembly 100.

At 602, a custom mold extending in the x-y plane and having a cross-section extending in the y-z plane is fabricated. In an example, the custom mold may be made of aluminum or a non-metal compatible with fluorosilicone and application/curing temperatures used in method of making assembly 100. The custom mold includes cut-outs or empty channels having respective flat bottom surfaces (lying in the x-y plane) and shaped to define an empty volume (and depth/height in the z-direction) that matches the shape and dimensionality of housing 102. For example, the custom mold includes an elongate middle section channel (matching the shape of middle section 112) having a left end that branches into spaced-apart left leg channels that include curved sections to match the shapes of left legs 120A, and a right end that branches into spaced-apart right leg channels that include curved sections that match the shapes of right legs 120B. The channels corresponding to the middle section, the left legs, and the right legs are in fluid communication with each other. Where the right and left legs transition into N-fiber flat ribbons the mold may be made shallower (i.e., a depth of the channels reduced) since there are no longer multiples of N fibers (e.g., 84 total fibers) to be encapsulated.

At 606, fill the bottom halves (or slightly less than the bottom halves) of all of the channels of the mold with uncured encapsulant (e.g. uncured fluourosilicone); the goal being to subsequently position the optical fibers midway in the mold.

At 608, position the optical fibers in the channels of the mold, on top of the bottom half of the encapsulant already in the channels. The combined width of all of the optical fibers positioned side-by-side, e.g., in the y-direction, across each channel is less than the width of each channel in which the optical fibers are positioned so that a strip of uncured encapsulant is deposited between edges of the layer of optical fibers and walls of the channel. In addition, various techniques, such as application of an adhesive, may be used to hold the optical fibers positioned in each channel in place while operation 608 is performed.

At 610, fill the top halves (remainder) of the channels in the mold over top of the optical fibers positioned in the channels with the uncured encapsulant, and cure the encapsulant.

At 612, brush ends of the optical fibers that exit the over-mold (i.e., the ends that extend outside of the over-mold) with the uncured encapsulant, and cure the brushed encapsulant.

At 614, remove the resulting over-molded optical fibers from the mold and install connectors at the end of the optical fibers.

This results in an integrated optical fiber assembly/cable encapsulated within a fluorosilicone over-mold that is resistant to handling, chemicals, shock and vibration. All of the sets of the individual optical fibers are positioned within housing 102 so as to be entirely encapsulated by the molding composition of the housing (i.e., the molding composition of housing 102 surrounds the cross-sectional peripheries of the optical fiber sets and stack as shown in FIGS. 3 and 4) along the full coextensive lengths of the optical fibers and the housing components (i.e., along the lengths of the middle section, the left legs, and the right legs of the housing). The custom mold (and thus housing over-mold) may be designed to accommodate a variety of different shapes, different quantities of optical fibers, while maintaining a predetermined minimum bend radius.

Figure 7:
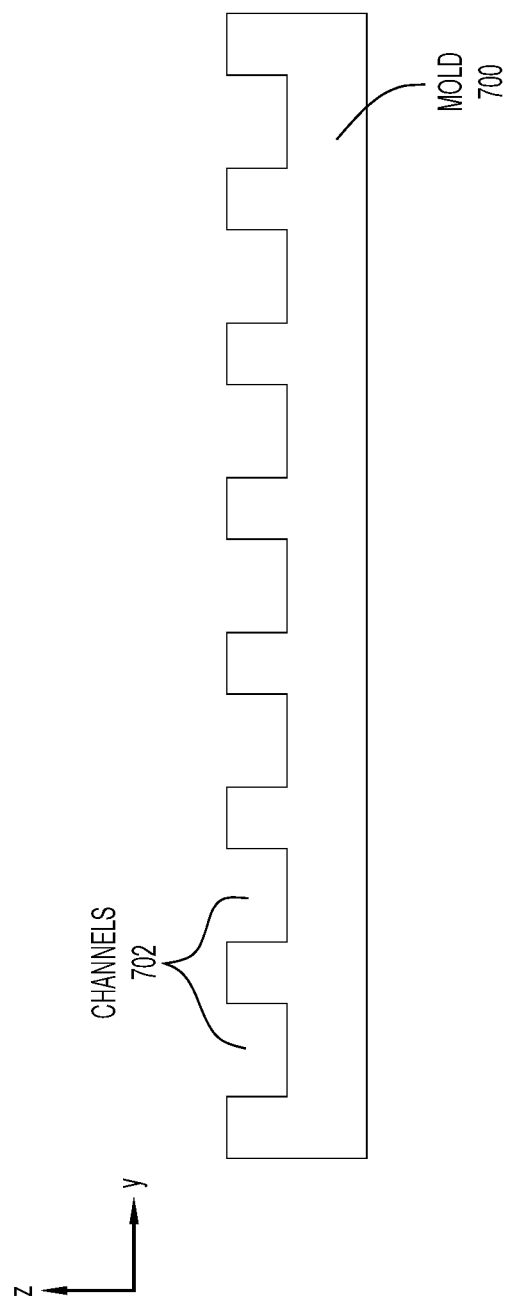
FIG. 7 is a cross-sectional view of an example custom mold used to make the assembly of FIG. 1, according to the invention.

FIG. 7 is a cross-section view of an example custom mold 700 used to make housing 102 prior to when uncured fluorosilicone is poured into the mold. Mold 700 includes channels 702 corresponding to right legs 120B.

Making the assembly as described above using/starting with individual fibers, rather than ribbon fiber, permits approximately 90 degree turns (or turns of more or less than 90 degrees) of the optical fibers in a single/same plane (i.e., in-plane), eliminating rotational stresses where the optical fibers join the optical fiber connectors. Additionally, stacking the individual optical fibers, e.g., 84 optical fibers, into one over-mold, reduces a height of the over-mold (housing) to less than 0.200 inches, e.g., to 0.190." The over-mold may be bonded to a printed wiring board (PWB) heatsink using RTV, for example, without damaging the fibers. Other advantages of the assembly, and of making the assembly, include:

a. The over-molded housing and embedded optical fibers are impervious to disruptive chemicals, handling, shock, and vibration;

b. 90 degree optical fiber turns may be made in-plane without forcing the optical fibers to bank upwards at a 90 degree angle;

c. A 0.50" minimum bend radius of the optical fibers, as embedded in the over-molded housing can be maintained at all times for maximum fiber performance;

d. Ribbon fibers can be bonded down and peeled back up for rework without damage to the optical fibers;

e. The assembly may be used with 12+ (e.g., 24, 36, 48 . . . ) position optical fiber connectors; and f. Large numbers of optical fibers may be stacked in direct contact with one another for a more compact assembly.

In summary, in one aspect, an over-molded multi-optical ribbon fiber assembly is provided comprising: an integrally formed housing over-mold including an elongate middle section having a first end that branches into spaced-apart first legs and a second end that branches into spaced-apart second legs; and multiple distinct sets of optical fibers, wherein: the optical fibers of all of the sets extend through the middle section of the housing as individual optical fibers in a non-ribbon fiber, densely packed, stacked configuration of the individual optical fibers; and the optical fibers of each set of optical fibers further: extend through a respective first leg and a respective second leg of the housing; extend past a free-end of the respective first leg, and transition to a respective first optical ribbon fiber outside of the housing; and extend out of a free-end of the respective second leg, and transition to a respective second optical ribbon fiber outside of the housing.

In another aspect, an apparatus is provided comprising: a printed circuit board (PCB); and an multi-optical ribbon fiber assembly fixed to the PCB, the assembly including: an integrally formed housing over-mold including an elongate middle section with a first end that branches into spaced-apart first legs and a second end that branches into spaced-apart second legs; multiple distinct sets of optical fibers, wherein: the optical fibers of all of the sets extend through the middle section of the housing as individual optical fibers in a non-ribbon fiber, densely packed, stacked configuration of the individual optical fibers; and the optical fibers of each set of optical fibers further: extend through a respective first leg and a respective second leg of the housing; extend past a free-end of the respective first leg, and transition to a respective first optical ribbon fiber outside of the housing; and extend out of a free-end of the respective second leg, and transition to a respective second optical ribbon fiber outside of the housing; and multiple optical fiber connectors fixed to the PCB and each terminating a respective one of the first and second optical ribbon fibers.

The above description is intended by way of example only. The description is not intended to be exhaustive nor is the invention intended to be limited to the disclosed example embodiment(s). Many modifications and variations will be apparent to those of ordinary skill in the art without departing from the scope and spirit of the invention.

What is claimed is:

1. An over-molded multi-optical ribbon fiber assembly comprising:
   an integrally formed housing over-mold including an elongate middle section having (i) a first end that branches into spaced-apart first legs that have respective curved sections that merge into the first end, and (ii) a second end that branches into spaced-apart second legs; and
   multiple distinct sets of optical fibers, wherein:
      the optical fibers of all of the sets extend through the middle section of the housing as individual optical fibers in a non-ribbon fiber, densely packed, stacked configuration of the individual optical fibers; and
      the optical fibers of each set of optical fibers further:
         extend through a respective first leg of the housing, including the curved section of the respective first leg, as individual optical fibers in the non-ribbon fiber configuration;
         extend through a respective second leg of the housing;
         extend past a free-end of the respective first leg, and transition to a respective first optical ribbon fiber outside of the housing; and
         extend out of a free-end of the respective second leg, and transition to a respective second optical ribbon fiber outside of the housing.

2. The assembly of claim 1, wherein:
   each ribbon fiber includes a single layer of the respective optical fibers bonded together with a layer of bonding material.

3. The assembly of claim 1, wherein each curved section has a bend radius that is not less than a predetermined minimum bend radius that ensures optimum optical transmission performance of the optical fibers that extend through the curved section.

4. The assembly of claim 1, wherein at least some of the curved sections bend through at least 90 degrees and the individual optical fibers of the set of optical fibers in each of the curved sections that bend through the 90 degrees form a substantially planar layer of optical fibers that bend through the at least 90 degrees in-plane.

5. The assembly of claim 1, wherein:
   the second legs have respective curved sections that merge into the second end of the middle section; and
   the optical fibers of each set of optical fibers extend through the curved section of the respective second leg as individual optical fibers in the non-ribbon fiber configuration.

6. The assembly of claim 1, wherein the middle section, the first legs, and the second legs of the housing extend in a planar direction, and the optical fibers of the sets of optical fibers extend beyond the respective free-ends in parallel with the planar direction.

7. The assembly of claim 6, wherein each ribbon fiber includes a single layer of the respective optical fibers bonded together with a layer of bonding material.

8. The assembly of claim 6, wherein the middle section has a height that extends in a transverse direction with respective to the planar direction and that is less than a combined height of all of the ribbon fibers stacked on top of each other in the transverse direction.

9. The assembly of claim 6, wherein the middle section has a width in the planar direction that is less than a combined width of all of the over-molded ribbon fibers lying side-by-side in the planar direction.

10. The assembly of claim 1, wherein the stacked individual optical fibers are in direct contact with other ones of the stacked individual optical fibers.

11. The assembly of claim 1, wherein the middle section comprises a molding composition of the housing and the stack is positioned in the middle section such that the molding composition entirely encapsulates the stack along corresponding lengths of the stack and the middle section.

12. The assembly of claim 1, wherein the stacked configuration includes layers of the individual optical fibers of the sets of the optical fibers in the non-ribbon fiber configuration.

13. The assembly of claim 12, wherein the individual optical fibers of each of the layers of the individual optical fibers are in direct contact with the individual optical fibers of adjacent ones of the layers of the individual optical fibers.

14. The assembly of claim 1, further comprising multiple optical fiber connectors each terminating a respective one of the first and second optical ribbon fibers.

15. The assembly of claim 1, wherein the housing is made of a fluorosilicone compound.

16. An apparatus comprising:
   a printed circuit board (PCB); and
   an multi-optical ribbon fiber assembly fixed to the PCB, the assembly including:
      an integrally formed housing over-mold including an elongate middle section with (i) a first end that branches into spaced-apart first legs that have respective curved sections that merge into the first end, and (ii) a second end that branches into spaced-apart second legs;
      multiple distinct sets of optical fibers, wherein:
         the optical fibers of all of the sets extend through the middle section of the housing as individual optical fibers in a non-ribbon fiber, densely packed, stacked configuration of the individual optical fibers; and
         the optical fibers of each set of optical fibers further:
            extend through a respective first leg of the housing, including the curved section of the respective first leg, as individual optical fibers in the non-ribbon fiber configuration;
            extend through a respective second leg of the housing;

extend past a free-end of the respective first leg, and transition to a respective first optical ribbon fiber outside of the housing; and
extend out of a free-end of the respective second leg, and transition to a respective second optical ribbon fiber outside of the housing; and
multiple optical fiber connectors fixed to the PCB and each terminating a respective one of the first optical ribbon fibers or the second optical ribbon fibers.

17. The apparatus of claim 16, wherein:
each ribbon fiber includes a single layer of the respective optical fibers bonded together with a layer of bonding material.

18. The assembly of claim 16, wherein each curved section has a bend radius that is not less than a predetermined minimum bend radius that ensures optimum optical transmission performance of the optical fibers that extend through the curved section.

19. The assembly of claim 16, wherein at least some of the curved sections bend through 90 degrees.

20. The assembly of claim 16, wherein the middle section comprises a molding composition of the housing and the stack is positioned in the middle section such that the molding composition entirely encapsulates the stack along corresponding lengths of the stack and the middle section.

* * * * *